United States Patent
Pigeon

(10) Patent No.: US 8,831,101 B2
(45) Date of Patent: Sep. 9, 2014

(54) METHOD AND SYSTEM FOR DETERMINING A METRIC FOR COMPARING IMAGE BLOCKS IN MOTION COMPENSATED VIDEO CODING

(75) Inventor: Steven Pigeon, Blainville (CA)

(73) Assignee: Ecole de Technologie Superieure, Montreal, Quebec ( * ) Notice: Subject to any disclaimer, the term of this patent is extended or adjusted under 35 U.S.C. 154(b) by 916 days.

(21) Appl. No.: 12/185,077

(22) Filed: Aug. 2, 2008

(65) Prior Publication Data

US 2010/0027662 A1 Feb. 4, 2010

(51) Int. Cl.
| | |
|---|---|
| H04N 7/12 | (2006.01) |
| H04N 19/527 | (2014.01) |
| H04N 19/61 | (2014.01) |
| H04N 19/182 | (2014.01) |
| H04N 19/43 | (2014.01) |
| H04N 19/137 | (2014.01) |

(52) U.S. Cl.
CPC ... *H04N 19/00781* (2013.01); *H04N 19/00593* (2013.01); *H04N 19/00303* (2013.01); *H04N 19/00509* (2013.01); *H04N 19/00145* (2013.01)
USPC ............. 375/240.16; 375/240.12; 375/240.14

(58) Field of Classification Search
CPC .................. H04N 19/00042; H04N 19/00157; H04N 19/00781; H04N 19/00363; H04N 19/0066
USPC ............... 375/240.01, 240.28, 240.16, 12, 14
IPC ........................................ H04N 7/12
See application file for complete search history.

(56) References Cited

U.S. PATENT DOCUMENTS

| | | | |
|---|---|---|---|
| 5,983,251 A | 11/1999 | Martens et al. | |
| 7,620,107 B2 | 11/2009 | Lee et al. | |
| 8,411,756 B2 | 4/2013 | Metoevi et al. | |
| 2002/0176495 A1 | 11/2002 | Vetro et al. | |
| 2003/0016751 A1 | 1/2003 | Vetro et al. | |
| 2003/0201994 A1 | 10/2003 | Taylor et al. | |
| 2004/0114817 A1 | 6/2004 | Jayant et al. | |
| 2005/0175099 A1 | 8/2005 | Sarkijarvi | |
| 2006/0088191 A1* | 4/2006 | Zhang et al. | 382/107 |
| 2006/0245497 A1* | 11/2006 | Tourapis et al. | 375/240.16 |
| 2007/0030901 A1 | 2/2007 | Joch et al. | |

(Continued)

FOREIGN PATENT DOCUMENTS

| | | |
|---|---|---|
| EP | 2234083 | 6/2011 |
| JP | 2004-129099 | 4/2004 |
| JP | 2004-199222 | 7/2004 |

OTHER PUBLICATIONS

Liu, B.; Zaccarin, A.; , "New fast algorithms for the estimation of block motion vectors," Circuits and Systems for Video Technology, IEEE Transactions on , vol. 3, No. 2, pp. 148-157, Apr. 1993 doi: 10.1109/76.212720.*

(Continued)

*Primary Examiner* — Jessica M Prince
(74) *Attorney, Agent, or Firm* — IP-Mex Inc.; Victoria Donnelly

(57) ABSTRACT

Method and system for determination of a metric measuring a difference between two image blocks used in motion compensated video coding of scenes are described. Only selected pixels in a block in the scene are processed for enhancing the speed of the metric computation.

24 Claims, 9 Drawing Sheets

(56) References Cited

U.S. PATENT DOCUMENTS

| | | | |
|---|---|---|---|
| 2007/0058718 | A1 | 3/2007 | Shen et al. |
| 2007/0201554 | A1 | 8/2007 | Sihn |
| 2007/0230919 | A1 | 10/2007 | Bourge et al. |
| 2007/0285500 | A1 | 12/2007 | Ma et al. |
| 2008/0002770 | A1 | 1/2008 | Ugur |
| 2008/0019559 | A1 | 1/2008 | Wang et al. |
| 2008/0043831 | A1 | 2/2008 | Sethuraman et al. |
| 2008/0151106 | A1* | 6/2008 | Verburgh et al. ............ 348/452 |
| 2008/0152000 | A1 | 6/2008 | Kaushik |
| 2008/0152005 | A1* | 6/2008 | Oguz et al. ............... 375/240.12 |
| 2008/0187046 | A1 | 8/2008 | Joch et al. |
| 2008/0205515 | A1 | 8/2008 | Kalva et al. |
| 2009/0083524 | A1* | 3/2009 | Van Wel ........................ 712/221 |
| 2009/0103622 | A1 | 4/2009 | Tripathi et al. |
| 2009/0110066 | A1 | 4/2009 | Wang et al. |
| 2010/0195716 | A1 | 8/2010 | Klein Gunnewiek et al. |
| 2010/0296580 | A1 | 11/2010 | Metoevi |
| 2010/0296581 | A1 | 11/2010 | Metoevi |
| 2011/0075732 | A1 | 3/2011 | Wada et al. |
| 2012/0027091 | A1 | 2/2012 | Hsu |
| 2012/0027092 | A1 | 2/2012 | Matsui |

OTHER PUBLICATIONS

Liu, B.; Zaccarin, A.;, "New fast algorithms for the estimation of block motion vectors," Circuits and Systems for Video Technology, IEEE Transactions on, vol. 3, No. 2, pp. 148-157, Apr. 1993 doi: 10.1109/76.212720.*

Liu, B.; Zaccarin, A, :"New Fast algorithms for the estimation of block motion vectors, " Circuits and Systems for Video Technology, IEEE Transactions on vol. 3 No. 2 pp. 148-157, Apr. 1993 dol.*

G. Sullivan, Draft Text of Recommendation H.263 Version 2 ("H.263+") for Decision, Sep. 25, 1997, ITU.

ITU-T Recommendation H.264, Series H: Audiovisual and Multimedia Systems Infrastructure of audiovisual services—Coding of moving video, Advanced video coding for generic audiovisual services, Mar. 2005.

M. Alberink et al., GigaCE/D1.11 project, Telematica Instituut, Enschede, The Netherlands, Jul. 21, 2001.

J. Bialkowski et al., A Fast H.263 to H.264 Inter-Frame Transcoder with Motion Vector Refinement, 2004, p. 6., Siemens AG, CT IC 2, Munich, Germany.

J. Bialkowski et al., Fast Video Transcoding from H.263 to H.264/MPEG-4 AVC, Business Media, LLC 2007, p. 20, Springer Science.

Q. Tang et al., Fast Block Size Prediction for MPEG-2 to H.264/AVC Transcoding, IEEE Xplore, 2008, p. 4, ICASSP.

V. Bhaskaran et al., Image and Video Compression Standards: Algorithms and Architectures, 2nd edition, 1997, p. 454, Kluwer Academic Publishers, Norwell, MA, USA.

S. Zhu et al., A New Diamond Search Algorithm for Fast Block-Matching Motion Estimation, IEEE Transactions on Image Processing, vol. 9, No. 2, Feb. 2000, pp. 287-290, IEEE.

S.Borman, M. Robertson and R.L. Stevenson "Block-Matching Sub-Pixel Motion Estimation from Noisy, Under-Sampled Frames—An Empirical performance Evaluation" SPIE Visual Communications and Image Processing Conference 1999.

W. Li and E. Salari "Successive Elimination Algorithm for Motion Estimation", IEEE Transactions on Image Processing, vol. 4, Issue 1, Jan. 1995, pp. 105-107.

F. Tombari, S. Mattocia, L. Di Stefano, "Template Matching Based on Lp Norm Using Sufficient Conditions with Incremental Approximation", IEEE International Conference on Video and Signal Based Surveillance, Nov. 2006, p. 20.

U. Koc and K.J.R. Liu, "Interpolation-free Subpixel Motion Estimation Technique in DCT Domain", IEEE Transactions on Circuits and Systems for Video Technology, vol. 8, Issue 4, Aug. 1998, pp. 460-487.

S. Lee, S.-I Chae, "Motion Estimation Algorithm using Low Resolution Quantization", Electronic Letters, vol. 21. No. 7, Mar. 28, 1996, p. 647.

C.-K. Cheung, L.-M. Po, "A Hierarchical Block Motion Estimation Algorithm using Partial Distortion Measure" IEEE International Conference on Image Processing, vol. 3, Oct. 1997, pp. 606-609.

Y.-L. Chan, W.-C. Siu, "New Adaptive Pixel Decimation for Block Motion Vector Estimation", IEEE Transactions on Circuits and Systems for Video Technology, vol. 6, Issue 1, Feb. 1996, pp. 113-118.

S. Suthaharan, S.-W. Kim, and K.R. Rao "A new quality metric based on just-noticeable difference, perceptual regions, edge extraction, and human vision", Canadian Journal Electr. Comput. Eng., vol. 30, No. 2, Spring 2005.

T. Toivonen and J. Heikkila "Efficient Method for Half-Pixel Block Motion Estimation Using Block Differentials", Published by Springer-Verlag, International Workshop VLBV, Madrid, Spain, Sep. 18-19, 2003.

K.-C. Hui, W.-C. Siu, and Y.-L. Chan "New Adaptive Partial Distortion Search Using Clustered Pixel Matching Error Characteristic" IEEE Transactions on Image Processing, vol. 14, No. 5., May 2005 p. 597.

C. J. Duanmu, M. O. Ahmad "Fast Block Motion Estimation With 8-Bit Partial Sums Using SIMD Architectures" IEEE Transactions of Circuits and Systems for Video Technology, vol. 17, No. 8, Aug. 2007, p. 1041.

B. Liu, A. Zaccarin "New Fast Algorithms for the Estimation of Block Motion Vectors" IEEE Transactions on Circuits and Systems for Video technology, vol. 3, No. 2, Apr. 1993, p. 148.

Y.K. Lee et al., MPEG-4 to H.264 Transcoding, IEEE Tencon, Nov. 2005, p. 6, Ecole de Technologie Superieure.

ISO/IEC 14496-5:2001, Information Technology—Coding of Audio-Visual objects, Part 5: Reference Software, Second Edition, Feb. 2005.

ISO/IEC 14496-2, Information technology—Coding of audio-visual objects—Part 2: Visual, Second edition, Dec. 1, 2001, p. 536, ISO/IEC.

ISSO/IEC 14496-10 AVC and ITU-T rec. H.264, Advanced Video Coding for Generic Audiovisual Services,Series H: Audiovisual and Multimedia Systems,Infrastructure of Audiovisual Services—Coding of Moving Video, Mar. 2005, p. 343.

3GPP2 C.S0045-A, Multimedia Messaging Service (MMS) Media Format and Codecs for cdma2000 Spread Spectrum Systems, Version 1.0, Mar. 31, 2006, p. 22, 3GPP2.

3GPP, Technical Specification Group Services and System Aspects, Transparent end-to-end Packet-switched Streaming Service (PSS), Protocols and codecs (Release 7), Mar. 2009, p. 17, 3GPP.

3GPP, Technical Specification Group Services and System Aspects, Multimedia Messaging Service (MMS), Media formats and codecs (Release 7), Jun. 2007, p. 17, 3GPP.

3GPP2 C.S0046-0, 3G Multimedia Streaming Services, 3G Multimedia Streaming Services, Version 1.0, Feb. 21, 2006, p. 59, 3GPP.

B. Shen, From 8-Tap DCT to 4-Tap Integer-Transform for MPEG to H.264/AVC Transcoding, IEEE International Conference on Image Processing (ICIP),vol. 1, pp. 115-118, Oct. 2004.

Y.K. Lee et al., MPEG-4 to H.264 Transcoding using Macroblock Statistics, IEEE International Conference on Multimedia and Expo, Jul. 2006, pp. 57-60.

Y. Liang et al., MPEG-4 to H.264/AVC Transcoding, The International Wireless Communications and Mobile Computing Conference, Aug. 2007, pp. 689-693.

T. N. Dinh et al., Reducing Spatial Resolution for MPGE-4 / H.264 Transcoding with Efficient Motion Reusing, The 7th International Conference on Computer and Information Technology, Oct. 2007, pp. 577-580.

S.E. Kim et al., Efficient Motion Estimation Algorithm for MPEG-4 to H.264 Transcoder, IEEE International Conference on Image Processing (ICIP),vol. 3, pp. 659-702, Sep. 2005.

T.D. c to H.264/AVC Transcoding with Spatial Downscaling, ETRI, vol. 29, Dec. 2007, pp. 826-828.

H.264/AVC Reference software JM 15.01 (Online), p. 89, http:iphome.hhi.de/suehring/tml/.

ISR and WO, CA, Apr. 7, 2009, PCT.

3GPP TS 26.234 v10.1.0, "Packet-switched Streaming Service (PSS); Protocols and codecs (Release 10)," Jun. 2011.

3GPP TS 26.140 v10.0.0, "Multimedia Messaging Service (MMS); Media formats and codecs (Release 10)," Mar. 2011.

(56) References Cited

OTHER PUBLICATIONS

3GPP2 C.S0045-A, "Multimedia Messaging Service (MMS) Media Format and Codecs for cdma2000 Spread Spectrum Systems," version 1.0, March.

I. Metoevi, S. Coulombe, "Efficient MPEG-4 to H.264 transcoding exploiting MPEG-4 block modes, motion vectors, and residuals," ISCIT (International Symposium on Communications and Information Technologies), Incheon, South Korea, Sep. 2009.

K.P. Lim, G. Sullivan and T. Wiegand, "Text Description of Joint Model Reference Encoding Methods and Decoding Concealment Methods," Joint Video Team Document JVT-O079, Apr. 2005.

H.R. Lindman, "Analysis of variance in complex experimental designs," W.H. Freeman & Co. Hillsdale, NJ USA, 1974.

J. R. Jain and A. K. Jain, "Displacement Measurement and its Application in InterFrame Image Coding," IEEE Transactions on Communications, vol. COM-29, pp. 1709-1808, Dec. 1981.

A.M. Tourapis, O.C. Au and M.L. Liou, "Predictive Motion Vector Field Adaptive Search Technique (PMVFAST)—Enhancing Block Based Motion Estimation," Department of Electrical and Electronic Engineering, Hong Kong University of Science and Technology, Hong Kong, 2000.

Hur, Jae-Ho and Lee, Yung-Lyul Lee "H.264 to MPEG-4 Transcoding Using Block Type Information" TENCON 2005, Melbourne, pp. 1-6 Nov. 24, 2005.

Oh, Seung-Kyun et al. "Motion Vector Estimation and Adaptive Refinement for the MPEG-4 to H.264/AVC Video Transcoder" Dec. 4-7, 2006.

Nguyen et al. "Efficient Video Transcoding Between H.263 and H.264/AVC Standards" May 23-26, 2005.

Nguyen et al. "Efficient Video Transcoding from H.263 to H.264/AVC Standard with Enhanced Rate Control" Shcool of Electrical & Electronic Engineering, Mayang Technological University, Journal on Applied Signal Processing, vol. 2006, pp. 1-15, Feb. 18, 2006.

T.D.Nguyen, G-S Lee, J-Y Chang, H-J. Cho, Efficient MPEG-4 to H.264/AVC Transcoding with Spatial Downscaling, ETRI, vol. 29, Dec. 2007, pp. 826-828.

A. Vetro et al., Video Transcoding Architectures and Techniques: An Overview, IEEE Signal Processing Magazine, 20(2):18-29, Mar. 2003.

B.G. Kim et al., Enhanced Inter Mode Decision Based on Contextual Prediction for P-slices in H.264/AVC Video Coding, ETRI Journal, vol. 28, No. 4, Aug. 2006, pp. 425-434.

Intel(R) Integrated Performance Primitives 5.3—Code Samples (Online), p. 4, http://software.intel.com/en-us/articles/intel-integrated-performance-primitives-code-samples/.

H.264/AVC Reference software JM 15.01 (Online), p. 89, http://iphome.hhi.de/suehring/tml/.

A.M. Tourapis, Enhanced Predictive Zonal Search for Single and Multiple Frame Motion Estimation, Visual Communications and Image Processing, Jan. 2002, pp. 1069-1079.

J. Bialkowski et al., Overview of Low-Complexity Video Transcoding from H.263 to H.264, IEEE International Conference on Multimedia and Expo, Jul. 2006, pp. 49-52.

Jon Stokes, "SIMD architectures: What do Sony's Playstation2 and Motorola's MPC7400 (a.k.a. the G4) have in . . . ", Mar. 21, 2000, retrievable at http://arstechnica.com/features/2000/03/simd.

S. Borman, M. A. Robertson, R. L. Stevenson, "Block-matching subpixel motion estimation from noisy undersampled frames: an empirical performance evaluation," Proc. SPIE 3653, Visual Communications and Image Processing '99, 1442 (Dec. 28, 1998); doi: 10.1117/12.334654.

Intel Integrated Performance Primitives 5.3—Code Samples. [Online]. http://software.intel.com/en-us/articles/intelintegrated-performance-primitives-code-samples/ (last accessed Sep. 2, 2008).

H.264/AVC reference software JM 15.1. [Online]. http://iphome.hhi.de/suehring/tml/ (last accessed Mar. 2, 2009).

J. Bialkowski, M. Menden, M. Barkowsky, K. Illgner, A. Kaup, "A fast H.263 to H.264 inter-frame transcoder with motion vector refinement," presented at the Picture Coding Symposium (PCS), San Francisco, Dec. 2004.

J. Bialkowski, M. Barkowsky, and A. Kaup, "Fast video transcoding from H.263 to H.264/MPEG-4 AVC," Multimedia Tools Appl. 35, 2 (Nov. 2007), pp. 127-146, 2007; doi:10.1007/s11042-007-0126-7.

Q. Tang, P. Nasiopoulos, R. Ward "Fast block size prediction for MPEG-2 to H.264/AVC transcoding," Acoustics, Speech and Signal Processing, 2008. ICASSP 2008. IEEE International Conference on , vol., no., pp. 1029-1032, Mar. 31, 2008-Apr. 4, 2008; doi: 10.1109/ICASSP.2008.4517788.

V. Bhaskaran, K. Konstantinides. Image and Video Compression Standards: Algorithms and Architectures (2nd ed.) (The Springer International Series in Engineering and Computer Science). Kluwer Academic Publishers, Norwell, MA, USA, Jun. 1997, 472 pages.

H.R Lindman Analysis of variance in complex experimental designs, W.H. Freeman &Co, Hillsdale, N J USA, 1974, pp. 21-50, pp. 88-136.

ISO/IEC 14496-5:2001, "Information technology—Coding of audio-visual objects—Part 5: Reference software", second edition, Feb. 2005.

3GPP2 C.S0045-A, "Multimedia Messaging Service (MMS) Media Format and Codecs for cdma2000 Spread Spectrum Systems", version 1.0, Mar. 2006.

ITU-T/SG16, "Video codec test model, TMN8," Portland, Jun. 1997.

P. A. A. Assuncao and M. Ghanbari, "Post-processing of MPEG2 coded video for transmission at lower bit rates," in Proceedings of the 1996 IEEE International Conference on Acoustics, Speech, and Signal Processing, ICASSP. Part 4 (of 6). vol. 4: IEEE, Piscataway, NJ, USA, 1996, pp. 1998-2001.

N. Bjork and C. Christopoulos, "Transcoder architectures for video coding," IEEE Transactions on Consumer Electronics, vol. 44, pp. 88-98, 1998.

K. Panusopone, X. Chen, and F. Ling, "Logo insertion in MPEG transcoder," in 2001 IEEE Interntional Conference on Acoustics, Speech, and Signal Processing. vol. 2: Institute of Electrical and Electronics Engineers Inc., 2001, pp. 981-984.

J. Youn, J. Xin, and M.-T. Sun, "Fast video transcoding architectures for networked multimedia applications," in Proceedings of the IEEE 2000 Internaitonal Symposium on Circuits and Systems. vol. 4: Institute of Electrical and Electronics Engineers Inc., Piscataway, NJ, USA, 2000, pp. 25-28.

N. Feamster and S. Wee, "An MPEG-2 to H.263 transcoder," in Multimedia Systems and Applications II. vol. 3845: SPIE-Int. Soc. Opt. Eng, 1999, pp. 164-175.

Y.-K. Lee and Y.-L. Lee, "MPEG-4 to H.264 transcoding," in TENCON 2005—2005 IEEE Region 10 Conference. vol. 2007: Institute of Electrical and Electronics Engineers Inc., Piscataway, NJ 08855-1331, United States, 2007, p. 4084891.

I. Metoevi and S. Coulombe, "Efficient MPEG-4 to H.264 transcoding exploiting MPEG-4 block modes, motion vectors, and residuals," 2009 9th International Symposium on Communications and Information Technology, ISCIT 2009, Icheon, Korea, Republic of, 2009, pp. 224-229.

J. Bialkowski, M. Barkowsky, and A. Kaup, "Overview of low-complexity video transcoding from H.263 to H.264," in 2006 IEEE International Conference on Multimedia and Expo, ICME 2006. vol. 2006: Institute of Electrical and Electronics Engineers Computer Society, 2006, pp. 49-52.

P. List, A. Joch, J. Lainema, G. Bjontegaard, and M. Karczewicz, "Adaptive deblocking filter," IEEE Transactions on Circuits and Systems for Video Technology, vol. 13, pp. 614-619, 2003.

L. Qiang, L. Xiaodong, and D. Qionghai, "Motion information exploitation in H.264 frame skipping transcoding," in 9th International Conference on Advanced Concepts for Intelligent Vision Systems, ACIVS 2007. vol. 4678 NCS: Springer Verlag, Heidelberg, D-69121, Germany, 2007, pp. 768-776.

L. Chih-Hung, W. Chung-Neng, and C. Tihao, "A fast downsizing video transcoder based on H.264/AVC standard," in Advances in Multimedia Information Processing—PCM 2004. 5th Pacific Rim Conference on Multimedia. Proceedings, Part III: Springer-Verlag, 2004, pp. 215-223.

X. Di and P. Nasiopoulos, "Logo insertion transcoding for H.264/AVC compressed video," Piscataway, NJ, USA, 2009, pp. 3693-3696.

(56) References Cited

OTHER PUBLICATIONS

J. Zhang and A. T. S. Ho, "Efficient video authentication for H.264/AVC," Los Alamitos, CA, USA, 2006, p. 4 pp.

J.-H. Hur and Y.-L. Lee, "H.264 to MPEG-4 transcoding using block type information," in TENCON 2005—2005 IEEE Region 10 Conference. vol. 2007: Institute of Electrical and Electronics Engineers Inc., Piscataway, NJ 08855-1331, United States, 2007, p. 4084887.

J.-H. Hur and Y.-L. Lee, "H.264 to MPEG-4 resolution reduction transcoding," in TENCON 2005—2005 IEEE Region 10 Conference. vol. 2007: Institute of Electrical and Electronics Engineers Inc., Piscataway, NJ 08855-1331, United States, 2007, p. 4084886.

Intel Integrated Performance Primitives 5.3—Code Samples. [Online]. http://software.intel.com/en-us/articles/intel-integrated-performanceprimitives-code-samples/.

H.264/AVC reference software JM 16.1. [Online]. http://iphome.hhi.de/suehring/tml/.

ISO/IEC 14496-5:2001, "Information technology—Coding of audiovisual objects—Part 5: Reference Software," second edition, Feb. 2005.

A. Veto, C. Christopoulos, and H. Sun, "Video transcoding architectures and techniques: An overview," IEEE Signal Processing Magazine, vol. 20, pp. 18-29, 2003.

I. Ahmad, X. Wei, Y. Sun, and Y.-Q. Zhang, "Video transcoding: An overview of various techniques and research issues," IEEE Transactions on Multimedia, vol. 7, pp. 793-804, 2005.

J. Xin, C.-W. Lin, and M.-T. Sun, "Digital video transcoding," Proceedings of the IEEE, vol. 93, pp. 84-97, 2005.

T. Wiegand, H. Schwarz, A. Joch, F. Kossentini, and G. J. Sullivan, "Rate-constrained coder control and comparison of video coding standards," IEEE Transactions on Circuits and Systems for Video Technology, vol. 13, pp. 688-703, 2003.

ISO/IEC 14496-10 AVC and ITU-T rec. H.264, "Advanced video coding for generic audiovisual services," Mar. 2009.

ISO/IEC 14496-2, "Information technology—Coding of audio-visual objects—Part 2: Visual," second edition, Dec. 2001.

T. Shanableh and M. Ghanbari, "Heterogeneous video transcoding to lower spatio-temporal resolutions and different encoding formats," IEEE Transactions on Multimedia, vol. 2, pp. 101-110, 2000.

X. Jun, S. Ming-Ting, and C. Kangwook, "Motion Re-estimation for MPEG-2 to MPEG-4 Simple Profile Transcoding," in Int. Packet Video Workshop Pittsburgh, 2002.

Y. Jeongnam, S. Ming-Ting, and L. Chia-Wen, "Motion vector refinement for high-performance transcoding," IEEE Transactions on Multimedia, vol. 1, pp. 30-40, 1999.

H. Sun, W. W Kwok, and J. W. Zdepski, "Architectures for MPEG compressed bitstream scaling," IEEE Transactions on Circuits and Systems for Video Technology, vol. 6, pp. 191-199, 1996.

Z. Peng, H. Qing-Ming, and G. Wen, "Key techniques of bit rate reduction for H.264 streams," Berlin, Germany, 2004, pp. 985-992.

W. Zhu, K. H. Yang, and M. J. Beacken, "CIF-to-QCIF video bitstream down-conversion in the DCT domain," Bell Labs Technical Journal, vol. 3, pp. 21-29, 1998.

\* cited by examiner

METHOD AND SYSTEM FOR DETERMINING A METRIC FOR COMPARING IMAGE BLOCKS IN MOTION COMPENSATED VIDEO CODING

FIELD OF THE INVENTION

The invention relates to the field of motion compensated video coding, and in particular, to an improved method and system for the determination of a metric used for comparing image blocks in motion compensated video coding.

BACKGROUND OF THE INVENTION

Multimedia containing various content types including text, audio and video, provides an outstanding business and revenue opportunity for network operators. The availability of higher bandwidth and the use of packet-switched Internet Protocol (IP) technology have made it possible to transmit richer content that include various combinations of text, voice, still and animated graphics, photos, video clips, and music. In order to capitalize on this market potential network operators must meet customers' expectations regarding quality and reliability. Transcoding of media at server level is crucial for rendering multimedia applications in today's heterogeneous networks composed of mobile terminals, cell phones, computers and other electronic devices. The adaptation and transcoding of media must be performed at the service provider level because individual devices are often resource constrained and are rarely capable of adapting the media themselves. This is an important problem for service providers, as they will have to face a very steep traffic growth in the next few years; growth that far exceeds the speed up one can obtain from new hardware alone. Using a brute-force approach of increasing the number of servers is not sufficient. Moreover, an increase in the number of servers leads to proportional increases in power consumption, heat dissipation and space. Another way to improve system performance and handle the large growth in traffic is to devise smart techniques for video coding that forms an important and resource intensive phase of multimedia adaptation.

Motion compensated video coding processes scenes consisting of blocks and each block consists of a number of pixels. Essentially all modern video codecs use motion compensated coding where frames are encoded relative to a number of preceding frames to exploit temporal dependencies and get better compression. The most intensive phase of movement compensated video coding is the movement estimation phase. This is performed through a movement estimation algorithm that estimates the scene's objects displacements from one frame to the next. These estimations are used to create a synthetic frame where the scene is deformed to match the estimated movement of objects. That synthetic frame is used as a predictor for the current frame, which is differentially encoded. Such movement estimation algorithms are computationally intensive and account for a very large part of the encoder's runtime, increasingly so with resolution, making it a natural target for optimization.

A considerable amount of effort has been directed towards the problem of block-based movement estimation, a simplification to the general problem where the prediction frame is constructed from small rectangular regions copied from reference frames. A discussion of block-based movement estimation is provided next. For the explanation provided in this document we assume that the basic blocks are 16×16 pixels. Note that the same concepts are applicable for blocks of different sizes. The objective of the system is to produce a predicted frame for the current frame being encoded. This predicted frame is generated by differentially encoding the current frame from a given reference frame. For each 16×16 block in the current frame, the system looks for the best matching block in the reference frame. The search examines a number of blocks (not necessarily aligned on 16×16 boundaries) in the reference frame and selects the block that minimizes the difference with the current block. The motion vector, a key element in the motion estimation process, is simply the offset to the best matching block (in the reference frame) relative to the current block's position (in the current frame). The best matching block is then copied into the compensated frame or predicted frame at the current block's position. After this process, the predicted frame is the best approximation (according to the chosen metric measuring the difference between image blocks) one can build from the reference frame considering that only block copies are allowed. The compensated frame is used as the predictor to differentially encode the current frame.

A brief discussion of selected prior art references is presented below. Research has taken a number of different directions. S. Borman, M. Robertson, R. L Stevenson "Block Matching Sub-Pixel Motion Estimation from Noisy, Undersampled Frames" SPIE Visual Communications and Image Processing Conference 1999, presents an empirical study that concerns the effects of noise or sampling error in SAD, MSE, and NCF. The paper, W. Li, E. Salari, "Successive Elimination Algorithm for Motion Estimation", IEEE Transactions on Image Processing, Volume 4, Issue 1, January 1995, pages 105-107, explores the properties of SAD and MSE for devising a dynamic-programming like method for fast motion estimation. The authors focus on an algorithm, which does not require an exhaustive search in the solution space and discusses how properties of existing metrics are to be used; they do not propose any new metric. F. Tombari, S. Mattocia, L. di Stefano, "Template Matching Based on Lp Norm Using Sufficient Conditions with Incremental Approximation", IEEE International Conference on Video and Signal Based Surveillance, November 2006, page 20, extends the work of Li and Salari. The paper uses a similar dynamic-programming approach to compute a fast version of a metric.

U. Koc and K. J. R. Liu, "Interpolation-free Subpixel Motion Estimation Technique in DCT Domain", IEEE Transactions on Circuits and Systems for Video Technology, Volume 8, Issue 4, August 1998, pages 460-487 focuses on a subpixel level and tries to avoid subpixel interpolation in the space domain by using techniques in the DCT domain that are at least as complex as the techniques used in the space domain. The metric is extended appropriately for handling the shift to the DCT domain. S. Lee, S.-Ik Chae, "Two-step Motion Estimation Algorithm using Low Resolution Quantization", International Conference on Image Processing, Volume 3, September 1996, pages 795-798, focuses on motion estimation techniques. This paper presents a "fail fast" approach to SAD matching. The image is first quantized so that the precision of each pixel is reduced, for example from 8 bits per pixels to 4 bits per pixel. A first function compares the two blocks using the reduced precision version. If the results are acceptable, it proceeds to using a full precision metric. Although the research is presented with a hardware implementation in mind, it does not consider the effective utilization of a Single Instruction Multiple Data (SIMD) instruction set that includes SAD when the processor running the code provides such a facility. An important aspect of this invention is to reduce the time required in the computation of the metric by using such performance optimizing SIMD instruction sets that are provided in commercial processors available in the market today.

The research reported in C.-K. Cheung, L.-M. Po, "A Hierarchical Block Motion Estimation Algorithm using Partial Distortion Measure" International Conference on Image Processing, Volume 3, October 1997, pages 606-609 uses pixel sampling by using regular grid sampling, which is strictly equivalent to ordinary sub-sampling. They compute SAD/MSE using ½ or ¼, of the pixels (either in a quincunx pattern, or one in two columns, one in two rows). Blocks are checked against a ¼ grid SAD. If it is among the n better ones, it is kept for the next round, when a ½ grid density will be used. Of the n better ones obtained from the previous round, m will be retained, and thoroughly checked with a full SAD. Unfortunately, the approach proposed by Cheung and Po cannot effectively utilize SIMD type parallel operations.

The research reported in Y.-L. Chan, W.-C. Siu, "New Adaptive Pixel Decimation for Block Motion Vector Estimation", IEEE Transactions on Circuits and Systems for Video Technology, Volume 6, Issue 1, February 1996, pages 113-118 is similar to the paper by Cheung and Po. However, Chan and Siu use different sampling patterns: regular, excluding quincunx. They consider patterns of density ¼ and ⅑ (1 in 2×2 or one in 3×3), and they are not concerned with sub-pixel estimation.

Thus, various types of the metric measuring the difference between image blocks, to be referred to as the metric in the following discussion, have been used in existing codecs for block comparison. Irrespective of the exact metric used, its computation turns out to be computationally expensive.

Therefore, there is a need in the industry for an improved and effective method and system for fast computation of the metric measuring the difference between image blocks.

SUMMARY OF THE INVENTION

Therefore there is an object of the present invention to provide an improved method and system for the computation of the metric measuring the difference between two image blocks used for comparing blocks during motion compensated video coding.

According to one aspect of the invention, there is provided a method for determining a metric used in motion compensated video coding of a scene comprising frames, the metric measuring a difference between a first image block contained in a reference frame and a second image block contained in a current frame, the first and second image blocks comprising the same number of rows and columns of pixels, the method comprising: (a1) generating a pattern matrix having the same number of rows and columns as the first and second image blocks, for selecting a subset of pixels in the first and second image blocks; (b1) obtaining a characteristic of each pixel in the subset of pixels generated in the step (a1); and (c1) processing the characteristic of the subset of pixels for determining the metric.

Step (a1) further comprises: (a2) generating a global motion characteristic of the scene indicating a direction of movement of an object in the scene; and (b2) generating the pattern matrix corresponding to a CPU architecture used for the motion compensated video coding, the global motion characteristic generated in step (a2) and a pixel budget which is an estimate of number of pixels in the subset of pixels.

Step (a2) further comprises:
(a3) determining an average motion vector for the scene, the average motion vector having an amplitude and a direction; and (b3) comparing the amplitude of the average motion vector with a given threshold of no movement, comprising: (c3) determining the global motion characteristic as static signifying no object movement when the amplitude of the average motion vector is below the threshold; and (d3) determining the global motion characteristic as one of horizontal movement, vertical movement, or diagonal movement based on the direction of the average motion vector determined in step (a3) when the amplitude of the average motion vector is equal to or above the threshold.

Step (b2) further comprises: (a4) selecting the pattern matrix from a series of predetermined pattern matrices based on the CPU architecture used for the motion compensated video coding, the global motion characteristic, and the pixel budget.

Step (a4) further comprises: (a5) generating a repository of pattern matrices prior to performing motion compensation, each pattern matrix in the repository corresponding to the CPU architecture used for the motion compensated video coding, the global motion characteristic and the pixel budget.

Step (a5) further comprises: for each pattern matrix in the repository of pattern matrices: (a6) storing boolean values in cells of the pattern matrix, each cell corresponding to pixels occupying the same position in the first and second image blocks; and (b6) storing one of the "true" or "false" boolean values in those cells of the pattern matrix, which correspond to the pixels from the first and second image blocks to be included in a computation of the metric, and storing the other boolean value in those cells of the pattern matrix, which correspond to the pixels in the first and second image blocks to be excluded from the computation of the metric.

Step (b1) comprises: (a7) obtaining the characteristic, which is a luminance value; (b7) storing luminance values of pixels in the first image block in cells in a first matrix; and (c7) storing luminance values of pixels in the second image block in cells in a second matrix.

Step (c1) further comprises:
(a8) selecting cells in the first and the second matrices using the pattern matrix; and (b8) applying a Sum of Absolute Differences function on the luminance values stored in the cells selected in the step (a8). Step (c1) further comprises: (a9) selecting cells in the first and the second matrices using the pattern matrix; and (b9) applying a Mean Squared Error function on the luminance values stored in the cells selected in the step (a9).

A computer readable medium, having a computer readable program code means stored thereon, when executed by a computer, to perform the steps of the method as described above, is also provided.

According to another aspect of the invention, there is provided a method for fast computation of a metric used for motion compensated video coding of a scene, comprising blocks having pixels, the metric measuring a difference between a first and second image blocks, the method comprising: (a17) generating a pattern matrix for selecting a subset of pixels in the first and second image blocks; (b17) obtaining a characteristic of each pixel in the subset of pixels; and (c17) processing the characteristic of the subset of pixels for determining the metric.

Step (a17) further comprises: (a18) generating a global motion characteristic of the scene, indicating a direction of movement of an object in the scene; and (b18) generating the pattern matrix corresponding to a CPU architecture used for the motion compensated video coding and the global motion characteristic.

Step (a18) further comprises: (a19) determining an average motion vector for the scene, the average motion vector having an amplitude and a direction; (b19) comparing the amplitude of the average motion vector with a given threshold of no movement; (c19) determining the global motion characteristic as static signifying no object movement when the amplitude of the average motion vector is below the threshold; and (d19) determining the global motion characteristic as one of horizontal movement, vertical movement, or diagonal movement based on the direction of the average motion vector when the amplitude of the average motion vector is equal to or above the threshold.

Step (b18) further comprises: (a20) selecting the pattern matrix from a series of predetermined pattern matrices. Step of (b17) comprises: (a21) obtaining the characteristic, which is a luminance value; (b21) storing luminance values of pixels in the first image block in cells of a first matrix; and (c21) storing luminance values of pixels in the second image block in cells of a second matrix. For example, step (c17) may comprise: (a22) selecting cells in the first and the second matrices using the pattern matrix; and (b22) applying a Sum of Absolute Differences function on the luminance values stored in the cells selected in the step (a22). Alternatively, step (c17) may comprise: (a23) selecting cells in the first and the second matrices using the pattern matrix; and (b23) applying a Mean Squared Error function on the luminance values stored in the cells selected in the step (a8).

The subset of pixels comprises groups, the positions of the groups within the first and second image blocks maximizing a span of block coverage. The groups are preferably equidistant, and the pixels in each group preferably occupy successive positions in one of the rows of pixels.

According to yet another aspect of the invention, there is provided a system having a processor and memory, for determining a metric used in motion compensated video coding of a scene comprising frames, the metric measuring a difference between a first image block contained in a reference frame and a second image block contained in a current frame, the first and second image blocks comprising the same number of rows and columns of pixels, the system comprising: (a10) a pattern matrix generation unit, producing a pattern matrix, having the same number of rows and columns as the first and second image blocks, for selecting a subset of pixels in the first and second image blocks; (b10) an image retrieval unit, retrieving a characteristic of each pixel; and (c10) a metric computation unit, determining the metric by processing the characteristic of the subset of pixels.

The pattern matrix generation unit (a10) further comprises: (a11) a global motion characteristic determination unit, computing a global motion characteristic of the scene indicating a direction of movement of an object in the scene; and (b11) a matrix determination unit, generating the pattern matrix based on the global motion characteristic of the scene, a CPU architecture used in the motion compensated video coding and a pixel budget which is an estimate of number of pixels in the subset of pixels.

The matrix determination unit (b11) further comprises: (a12) a pattern matrix repository, storing a series of predetermined pattern matrices, each pattern matrix in the pattern matrix repository corresponding to the CPU architecture used in the motion compensated video coding, the global motion characteristic of the scene and the pixel budget; and (b12) a pattern matrix selection unit, selecting the pattern matrix from the pattern matrix repository. In the system the characteristic is a luminance value.

The metric computation unit (c10) comprises a Sum of Absolute Differences computing unit, applying the Sum of Absolute Differences function on the luminance values in the subset of pixels. The metric computation unit (c10) comprises a Mean Squared Error computing unit, applying the Mean Squared Error function on the luminance values in the subset of pixels.

The subset of pixels comprises groups, the positions of the groups within the first and second image blocks maximizing a span of block coverage.

Thus, an improved system and method for determining a metric used in motion compensated video coding have been provided.

BRIEF DESCRIPTION OF THE DRAWINGS

Further features and advantages of the invention will be apparent from the following description of the embodiment, which is described by way of example only and with reference to the accompanying drawings, in which.

DETAILED DESCRIPTION OF THE EMBODIMENT OF THE INVENTION

Because block-based motion estimation algorithms are based on the approximately correct assumption that the metric measuring the difference between two image blocks (often referred to in the literature as error) is concave around the optimal region, they depend only loosely on the actual metric and therefore should be resilient to efficient, low-cost, approximated metrics. This invention reduces the computational cost associated with the determination of the metric measuring the difference between image blocks by considering only selected pixels in the blocks being compared. Although the time required for determining the metric is reduced drastically, there is no significant degradation in the quality of the image.

Figure 1:
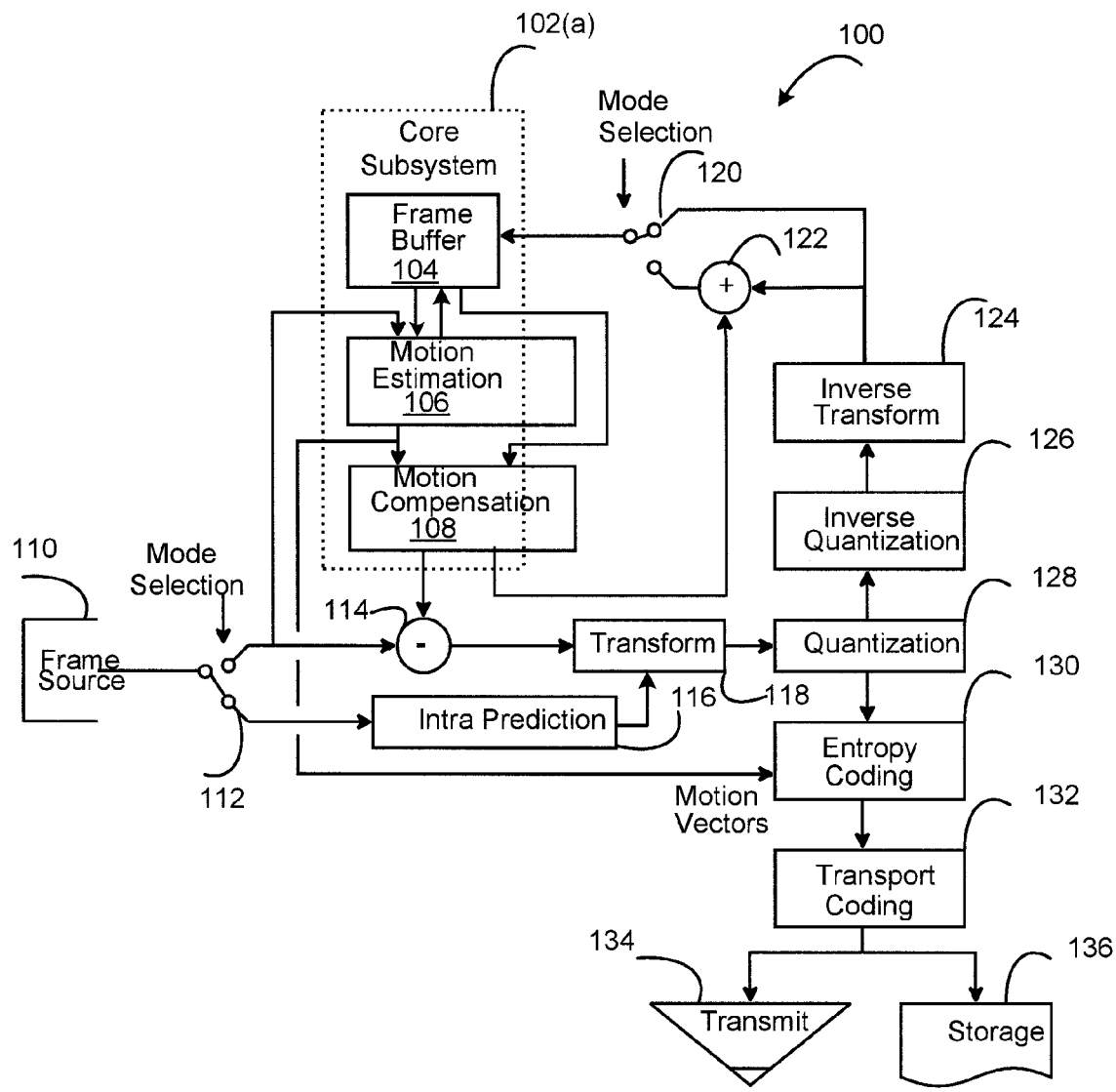
FIG. 1 illustrates a prior art system for motion compensated video coding.

Before discussing the invention in detail, a general description of motion compensated encoding is provided with the help of the system 100 shown in FIG. 1. The Core subsystem 102a includes a Frame Buffer module 104 that is connected to the Motions Estimation module 106 and the Motion Compensation module 108. The Motion Estimation module 106 is connected in turn to the Motion Compensation module 108. The Frame Buffer module 104 stores a number of previous frames that are required by the other modules to create motion-compensated frames that are used as predictors for the current frame under processing. Further details of the Core subsystem 102a that produces a motion compensated image are described in detail in FIG. 2.

The motion-compensated frame from the Motion Compensation module 108 is subtracted from the current image (shown by the minus operator 114 in FIG. 1) and the residual (the image difference) is sent to the transform step for encoding.

Frames are produced by a Frame Source 110 that can be any apparatus (e.g., a camera or a file) that feeds image frames into the encoder. The processing of the frames stored in Frame Source 110 depends on the mode selected. The Mode Selection module 112 indicates to the codec whether the incoming frame is to be coded with motion compensation or an "intra mode" is to be used. An intra mode is used with frames (e.g., as key frames) that cannot be decoded relative to other frames. They use some standalone coding that is limited to the data entirely contained within that image. Mode selection is external to motion compensation as this is a stream-level policy-based feature. Mode selection selects between interpolated frames (motion-compensated) or "key-frames" that can be decoded on their own, without compensation or reference to other frames. Key-frames are used, among other things, to seek to a specific position in the video without decoding previous frames. Decompression can only start at key-frames, while motion-compensated frames depend on other frames and therefore cannot be the initial decompression point. When the Mode Selection module 112 selects the Intra Prediction module 116, this module 116 predicts the pixels within the current frame without the help of other frames. This prepares a key-frame for encoding. As mentioned earlier, the intra-coded frame does not depend on other frames for its compression/decompression. Further details of intra prediction are beyond the scope of the present discussion. If the Mode Selection module 112 selects to perform the transform operation, the frames after being processed in accordance with the output of the Motion Compensation module 108 are fed into the Transform module 118. Transformation is a codec-specific step, where the image is transformed from the spatial (pixel) domain to a frequency domain. This transform is usually the discrete cosine transform (DCT) or a kin transform. Transform coding is well known, and further discussion is not needed in the context of the present invention. After transforming the pixels into a frequency domain, the resulting data is quantized with the help of a Quantization Module 128. Quantization is basically a precision-reduction (therefore irreversible) step, which, in practice, means that fewer bits will be used to represent the data. The type and coarseness of quantization depend on the codec and the user-specified target quality/bit rate, respectively. The output of the Quantization module 128 is processed by the Inverse Quantization Module 126 and the Entropy Coding module 130 that also receives the motion vectors from the Motion Estimation module 106. Entropy coding is a codec-specific step where reduced precision data from the Quantization module 128 are encoded by using a variable length code and other compression techniques. At this level, no precision is lost, only a more efficient representation of data is used. Typically, it is a variation on Huffman coding, and uses either a static code that is precomputed, or some adaptive code that evolves as it codes the data. For more advanced codecs, such as H.264, more sophisticated techniques are used.

The output of the Entropy Coding module 130 is processed by the Transport Coding module 132. This module "wraps" the entropy-coded data into a transport format based on whether the output is stored as a file in a Storage module 136 or transmitted as data by the Transmit module 134. Typical transport file formats are MPEG TS, AVI, 3GP, etc. Transmission could be over RTP/RTSP, a real time transport protocol used to stream video over the Internet.

The Inverse Quantization module 126 receives the output of the Quantization module 128 and undoes the step performed by the Quantization module 128. However, this is not a perfect inverse, as quantization irremediably removes information; the Inverse quantization produces a reduced-precision approximation of the original data. This data is then processed by the Inverse Transform module 124. This module inverses the transform step and converts data from frequency domain to the pixel domain. At this point, one has a reduced precision approximation of the image that went in the Transform module 118.

At the upper center of the FIG. 1, there is a second Mode Selection switch 120 (inverse of the switch 112) that decides whether the image to add to the Frame Buffer module 104 is an intra frame or a motion-compensated frame. If it is an intra frame, then the output of the Inverse Transform module 124 is already a complete image and can therefore be added as is in the Frame Buffer module 104. If it is a motion compensated frame, the difference from the inverse transform is added back to the motion-compensated frame (the operation is symbolized by the plus operator 122 in the figure), resulting in the final coded image that is added to the Frame Buffer module 104.

Figure 2:
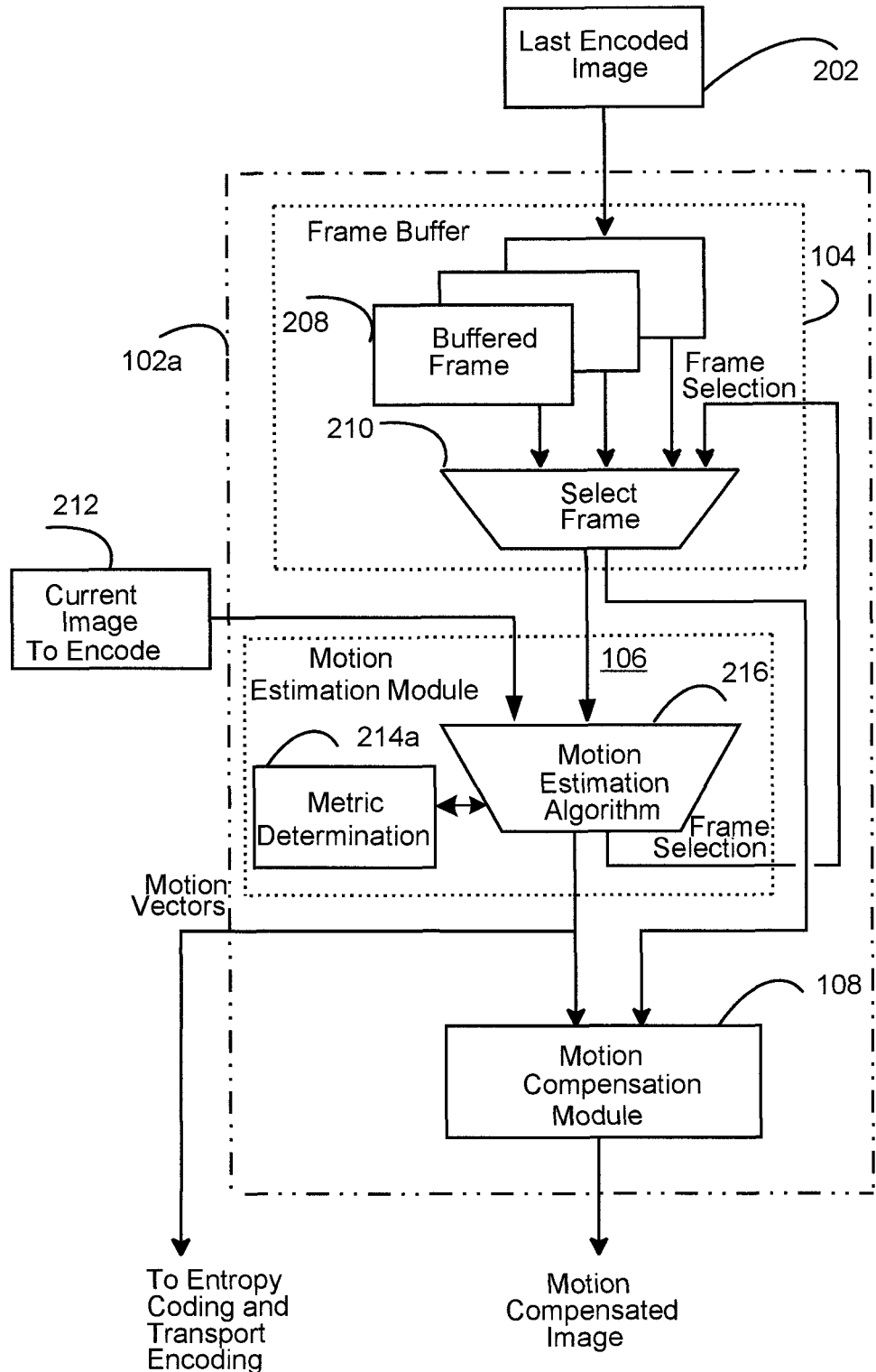
FIG. 2 presents the Core Subsystem 102a of FIG. 1 in more detail.

The Core subsystem 102a is explained with the help of FIG. 2. The Last Encoded Image 202 is an image produced by the Inverse Transform module 124 of FIG. 1 and is inserted in the Frame Buffer module 104 that stores a number of frames. Typically, the Frame Buffer module 104 is limited to storing very few Buffered Frames 208, that typically include the last one or two encoded images. When a new frame is added, the oldest frame (the one that has been in the buffer for the longest time) is discarded, ensuring that the buffer does not grow indefinitely. In certain codecs, such as H.264, however, the number of frames can be as high as 16, but in general it is limited to the previous frame only. The Select Frame module 210 selects the appropriate frame for the next module depending on Frame Selection output from the Motion Estimation Algorithm 216.

The Current Image to Encode 212 and the frame selected by the Select Frame module 210 are processed by the Motion Estimation module 106 that deploys the Motion Estimation Algorithm 216 that performs the actual motion estimation. It uses the Metric Determination module 214a, producing the metric used to measure the difference between two image blocks. Depending on the complexity of the Motion Estimation Algorithm 216, frame selection can be as simple as "obtain the last frame" or more complex as in the selection of half-frames in an interlaced mode. Frame selection also depends on the specific codecs supported. Some will support only the last frame as a reference frame, but some codecs, such as H.264, allow patches to come from a large number of images (up to 16 in this case). This module returns the motion vectors (which may also include references to multiple previous frames).

The output of the Motion Estimation Algorithm 216 is used by the Motion Compensation module 108. This module applies the transformations described by the motion vectors (and references to previous frames). The Motion Compensation module 108 stitches a prediction image from parts of the reference frame(s) as specified by the motion vectors.

Figure 3:
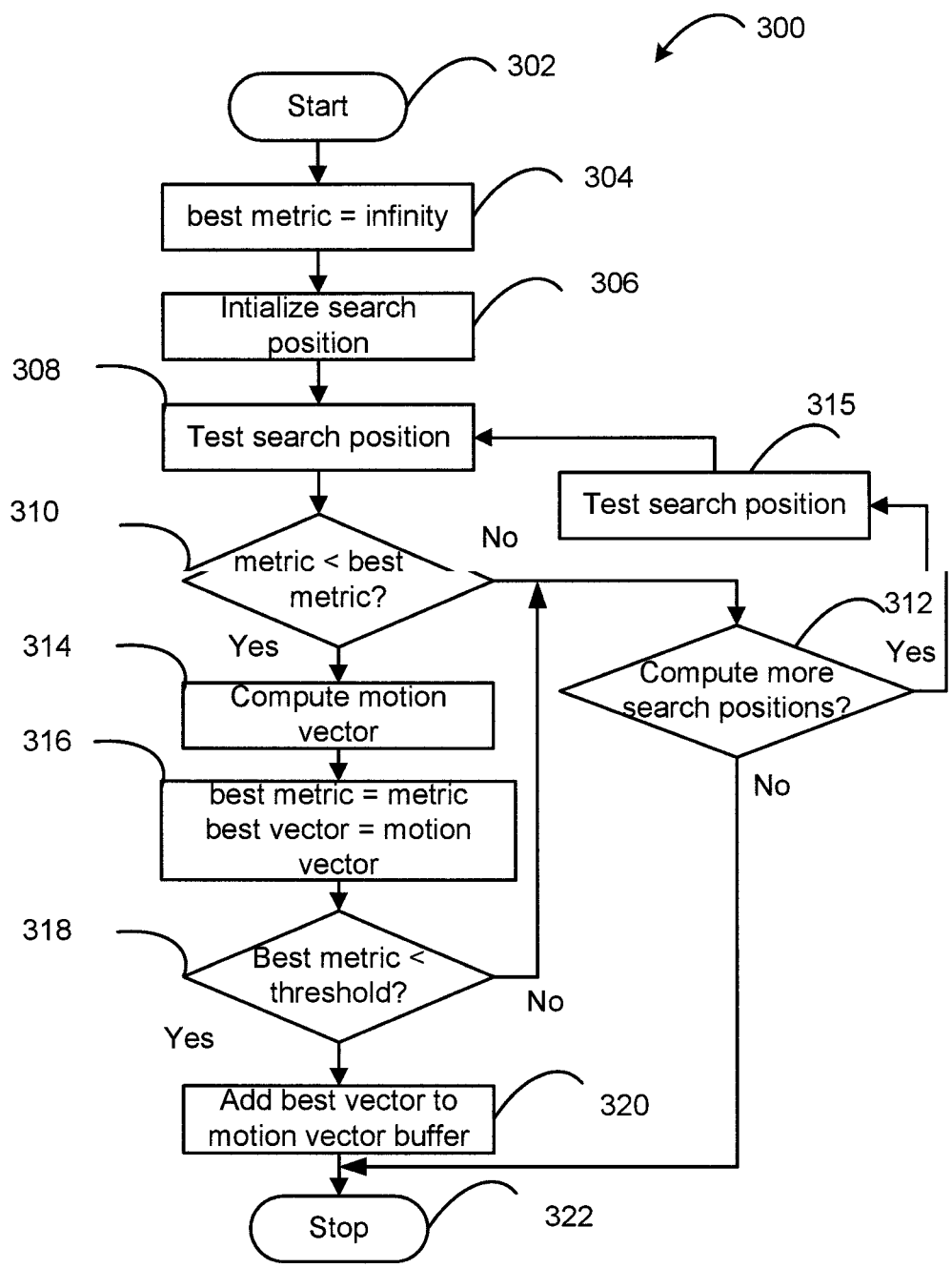
FIG. 3 shows a flowchart illustrating steps of the prior art method for motion estimation in compensated video coding.

The steps of the method executed by a typical motion estimation algorithm is explained with the help of flowchart 300 presented in FIG. 3. Upon start (box 302), the procedure 300 sets the variable best metric to an arbitrary large value (box 304) and initializes the search position (box 306). Search position is the position of the block in the reference frame that is compared to the current block to compensate in the current frame that is being processed. The motion estimation algorithm generates a number of such positions in the reference frame and tests blocks at those positions by comparing them to the current block in the current frame. The procedure 300 then tests the search position (box 308). The search position is tested by applying the Sum of Absolute Differences (SAD) function on the luminance value of each pixel stored in the corresponding cells of the two matrices a and b. The block from the reference frame being tested is referred to as the first block and the luminance values of its pixels are stored in a first matrix referred to by symbol a in the following equations. The block from the current frame that is being processed is referred to as the second block and the luminance values of its pixels are stored in a second matrix referred to by symbol b in the following equations. A cell in row i and column j of the two matrices are referred to as a[i,j] and b[i,j] respectively. Thus, $$SAD = \Sigma_{(i,j)} |a[i,j] - b[i,j]|$$

The magnitude of the resulting difference between the two blocks as computed by this SAD function, and referred to as the metric, is compared with best metric (box 310). If metric is lower than best metric then the procedure 300 exits "Yes" from box 310 and computes the motion vector (box 314) from this search position. Otherwise, the procedure 300 exits "No" from box 310 and checks whether or not additional search positions need to be generated (box 312). If not, the procedure 300 exits "No" from box 312 and exits (box 322). Otherwise, a new search position is generated (box 315) and the procedure 300 loops back to the entry of box 308. After computing the motion vector in box 314, the procedure 300 stores the value of metric in best metric and the motion vector computed in Box 314 in a variable called best vector (box 316). Whether best metric is lower than a predetermined threshold is checked next (box 318). If not, the procedure 300 exits "No" from box 318 and loops back to the entry of box 312. Otherwise, the procedure 300 exits "Yes" from box 318, adds best vector to the motion vector buffer (box 320) and exits (box 322). Computation of the metric measuring the difference between two image blocks by using a SAD function, for example, is time consuming because it is based on every pixel in the two blocks. The current invention reduces the computational complexity significantly by deploying two different techniques. Only a selected subset of pixels are used in the computation of the metric:

$$P\text{-}SAD = \Sigma_{(i,j \in P)} |a[i,j] - b[i,j]|$$

P-SAD is the optimized pattern based SAD function that uses only the subset of pixels that are included in P and is based on a pattern matrix used for the selection of the subset of pixels. The computational complexity of P-SAD is directly proportional to the number of i,j pairs that are included in the computation. The pixels (identified by i,j) are selected in such a way that the distortion in the resulting image is negligibly small. The P-SAD procedure accepts three arguments: the a matrix, the b matrix and a pattern matrix. Pattern is a boolean matrix and includes a "true" or "false" at a particular combination of i and j to indicate whether or not a particular set of pixel luminance values, a[i,j] and b[i,j], is to be included in the computation of P-SAD: a value of "true" for pattern[i,j] indicates that the corresponding a[i,j] and b[i,j] pair is included in the computation of P-SAD whereas a value of "false" means that the corresponding a[i,j] and b[i,j] pair is excluded from this computation. By reducing the number of terms that are used in the computation of P-SAD, the computational complexity is greatly reduced. The execution time for the computation of P-SAD is further optimized by selecting successive pixels in a row referred to as a group. A number of available CPUs can operate on such a group in a single CPU instruction. Several CPU's existing in the market include a Single Instruction, Multiple Data (SIMD) instruction set for performing such an operation. Examples include Intel's Pentium III series processors that include the Streaming SIMD Extensions (SSE) to the x86 architecture. 3DNow! is a multimedia extension for AMD's K6 processor that provides the packed SAD from byte summed to word (PSADBW) instruction.

Figure 4:
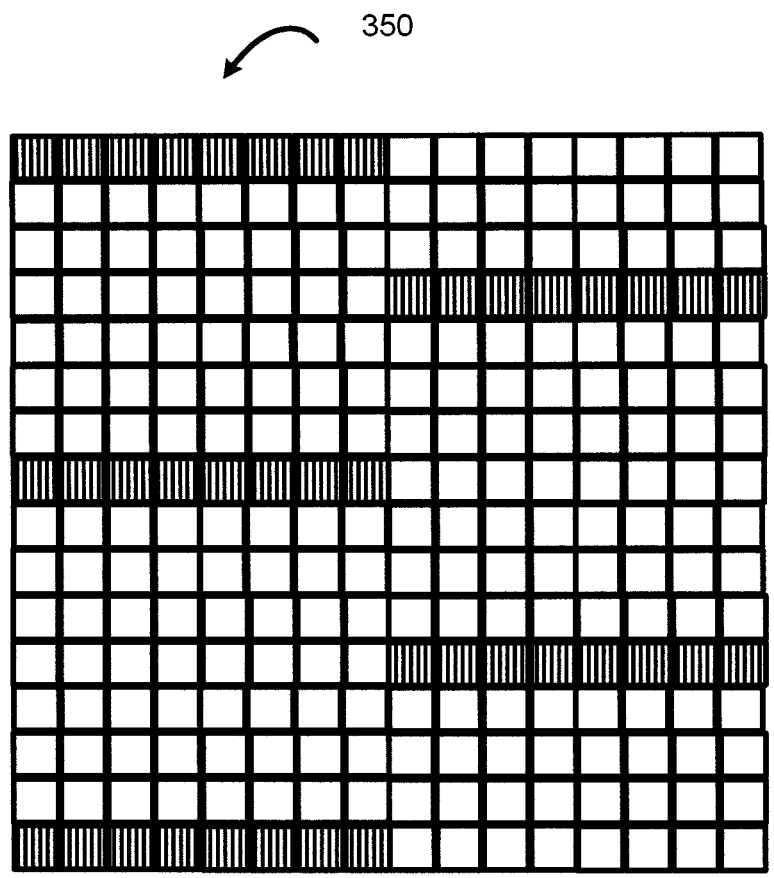
FIG. 4(a) presents an example for illustrating successive pixels selection based on the CPU architecture for reducing the computation cost of metric determination according to the embodiment of the present invention.
FIG. 4(b) presents an Improved Core Subsystem 102b of the embodiment of the present invention.
FIG. 4(c) shows units in the Improved Metric Determination Module 214b of FIG. 4(b)

An example with five groups is shown in diagram 350 displayed in FIG. 4(a) where the gray cells indicate the selected pixels that are used in the computation of P-SAD for an example 16×16 block. Each group in this example includes eight pixels. Please note that a pattern matrix is constructed in such a way that the groups are as equidistant as possible (in both the horizontal and vertical directions) and the span of block coverage is maximized (see FIG. 4(a)). The vertical distances between any two adjacent groups of FIG. 4(a) are approximately equal whereas the horizontal distances between any two adjacent groups are equal to one another. With such positions of groups within a block, the span of block coverage is maximized. That is, the groups of FIG. 4(a) are not clustered in one region of the block, but are placed in a way to cover as much of the block as possible. An Intel Pentium III processor with its SSE, for example, can operate on a group represented by a set of eight successive gray cells occupying the same row in one CPU instruction.

The number of "true" values (or alternatively, "false" values) in the pattern matrix directly controls the cost associated with the computation of P-SAD, and is based on a pixel budget. The pixel budget is an estimate of the number of pixels in the selected subset of pixels processed by P-SAD. It may have a predetermined fixed value or may be specified by the user. The pattern matrix is chosen based on this pixel budget, the CPU architecture and the global motion characteristic of the scene being processed. The example of FIG. 4(a) corresponds to a pixel budget of 40. Assuming that an Intel Pentium III processor with its SSE is used to operate on a group comprising eight pixels in one instruction, the number of groups is 40/8=5 and thus five groups are used in the example of FIG. 4(a).

Figure 4B:
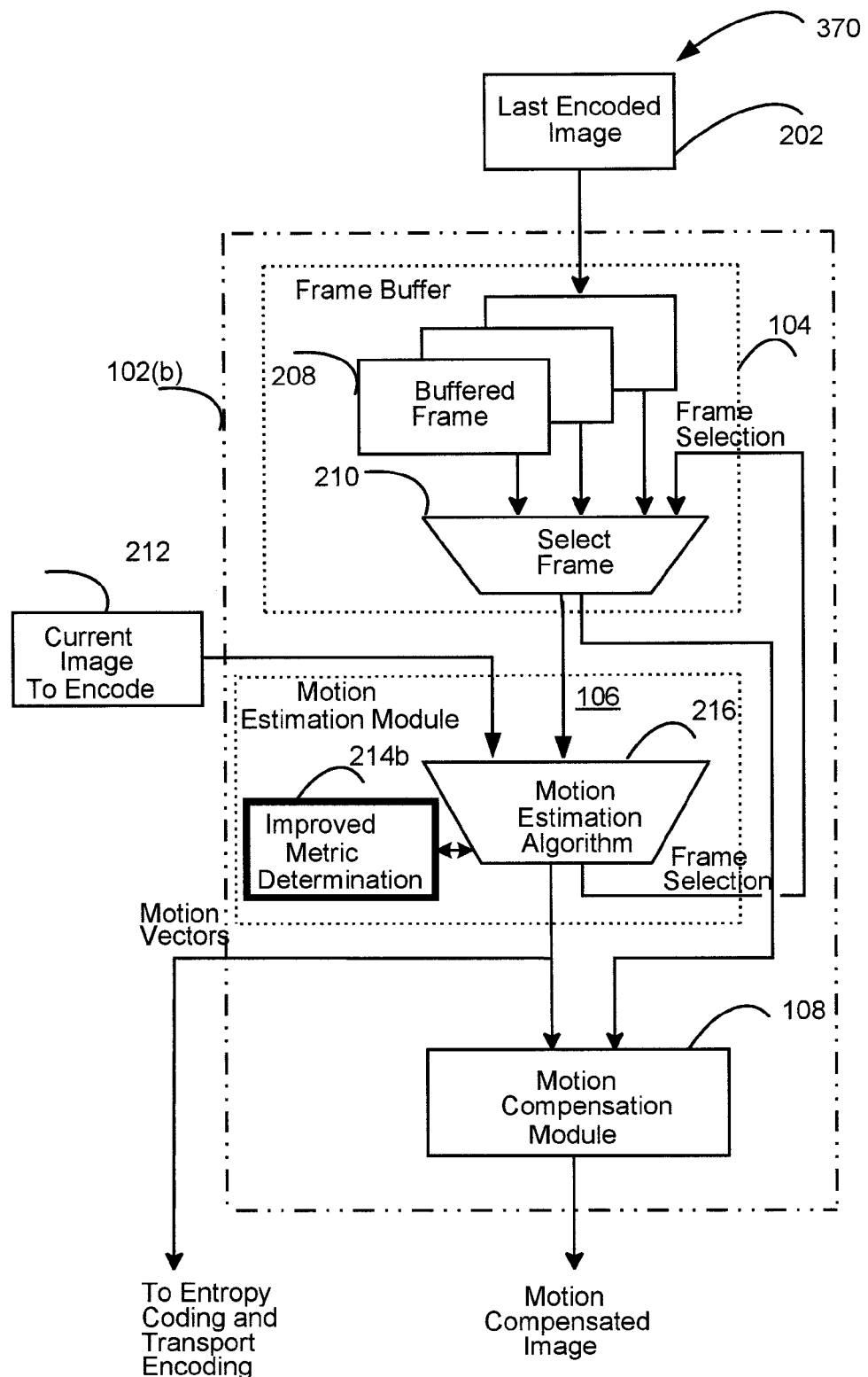
Figure 4:
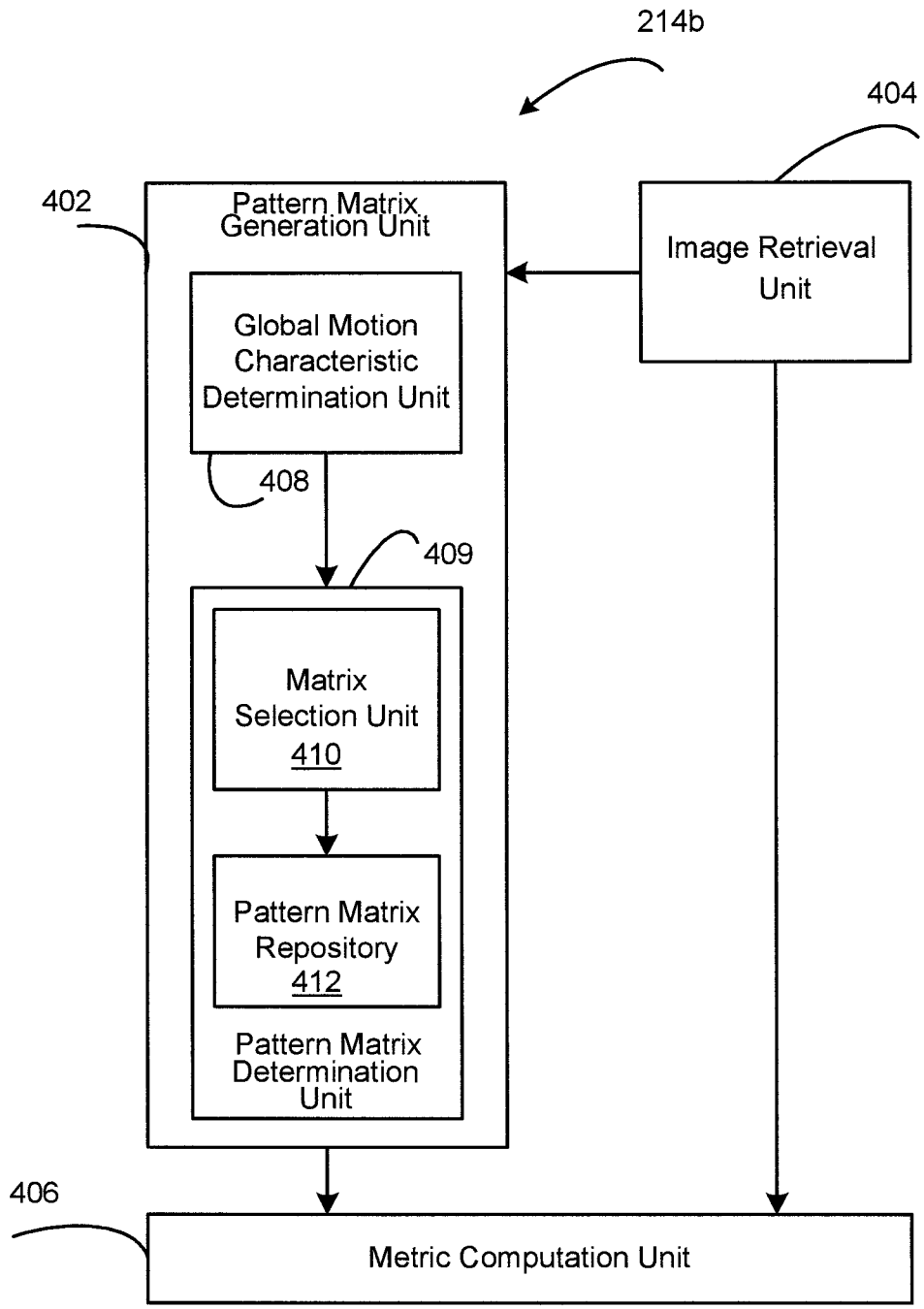

The embodiment of the current invention reduces the computational complexity of metric determination by improving the Metric Determination module 214a. An Improved Core Subsystem 102b that incorporates an Improved Metric Determination module 214b implementing the P-SAD function is shown in system 370 of FIG. 4(b) of the embodiment of the invention. Note that all components of the Improved Core Subsystem other than 214b are the same as those shown in the Core Subsystem 102a of FIG. 2. The system 370 of embodiment of invention includes a general purpose or specialized computer having a CPU and a computer readable medium, e.g., memory, DVD, CD-ROM or other medium, storing computer readable instructions for execution by the CPU. Alternatively, the system can be implemented in firmware, or combination of firmware and a specialized computer. Various modules of the system 370, including the Improved Metric Determination Module 214b, are implemented as computer readable instructions stored in the computer readable medium for execution by the CPU.

The Improved Metric Determination module 214b is explained with the help of diagram 214b presented in FIG. 4(c). As mentioned above, the Improved Metric Determination module 214b can be implemented in firmware, or alternatively, a computer software code stored in a computer readable medium.

The Improved Metric Determination Module 214b includes three units: the image retrieval unit 404, the pattern matrix generation unit 402 and the metric computation unit 406, comprising computer readable instructions stored in a computer readable medium. The characteristics of all pixels in the scene, such as their luminance values, are retrieved by the image retrieval unit 404 for performing motion compensated video coding. These characteristics are used by the pattern matrix generation unit 402 to generate an appropriate pattern matrix and by the metric computation unit 406 that determines the metric measuring a difference between a first image block contained in the reference frame and a second image block contained in the current frame that is being processed. In one embodiment of the invention, the metric computation unit comprises a Sum of Absolute Differences computation unit implementing function P-SAD discussed earlier. The pattern matrix generation unit 402 in turn includes two units: a global motion characteristic determination unit 408 and a pattern matrix determination unit 409, comprising computer readable instructions stored in a computer readable medium. The global motion characteristic determination unit 408 computes a global motion characteristic of the scene that indicates the direction of movement of an object in the scene. This information is used by the matrix determination unit 409 for selecting the pattern matrix to be used in motion compensated video coding of the scene. The pattern matrix determination unit 409 includes two units: matrix selection unit 410 and a pattern matrix repository 412 stored in a computer readable medium. The pattern matrix repository 412 stores a series of predetermined pattern matrices each of which corresponds to a CPU architecture and the global motion characteristic of the scene. The pattern matrix selection unit 410 is responsible for selecting the pattern matrix from the pattern matrix repository 412 based on the CPU architecture used in motion compensated video coding, the global motion characteristic of the scene being processed as well as the pixel budget. The pattern matrix repository includes a number of pattern matrices each of which corresponds to a specific combination of CPU architecture used in motion compensated video coding, the global motion characteristic of the scene and pixel budget. For the example presented in the context of FIG. 4(a), the pattern matrix repository will include four specific pattern matrices that correspond to an Intel Pentium III processor with its SSE extension and a pixel budget of 40. Each of these four pattern matrices corresponds to a specific global motion characteristic of the scene: static, horizontal movement, vertical movement and diagonal movement. Once the values for all the three factors are known the specific pattern matrix can be located and retrieved from the repository. The methods used for achieving these units are discussed next.

Figure 5:
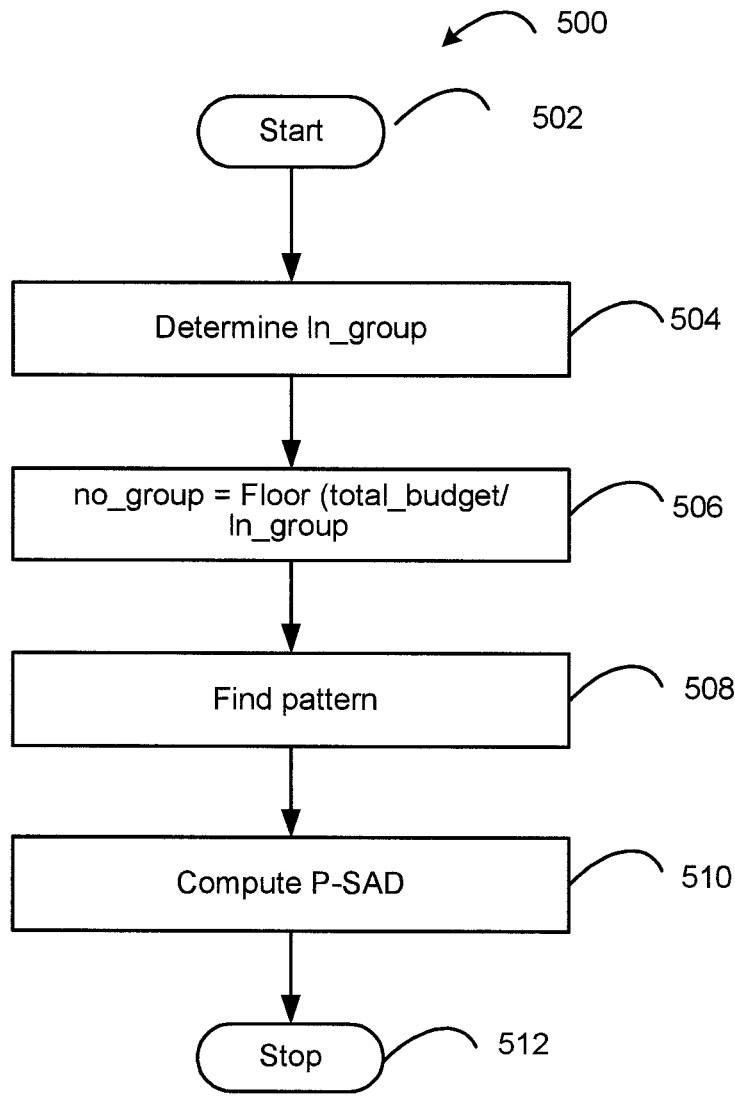
FIG. 5 shows a flowchart illustrating the steps of the method executed by the embodiment of the invention for determining the metric measuring the difference between image blocks.

The steps of the method to compute the value of P-SAD performed by the metric computation unit 406 are explained with the help of flowchart 500 presented in FIG. 5. Upon start (box 502), In_group, the number of pixels in a group, is chosen based on the CPU architecture (box 504). Recall that a group refers to successive pixels in a row that are processed by one CPU instruction. For example, if the CPU supports instructions that can process n pixels at a time, In_group is set to n. The number of such groups to be used referred to as no_group, is then computed (box 506). The Floor function produces the largest integer that is equal to or less than its argument. Based on In_group, no_group and global motion characteristic of the scene, the pattern matrix to be used is determined (box 508). In one embodiment of the invention the pattern matrix is chosen from a set of stored matrices. Once the pattern matrix is determined, the procedure 500 computes the P-SAD value (box 510) and exits (box 512). The storage of various pattern matrices and its selection in box 508 are discussed next. This is followed by a discussion of the method for computing P-SAD.

Figure 6:
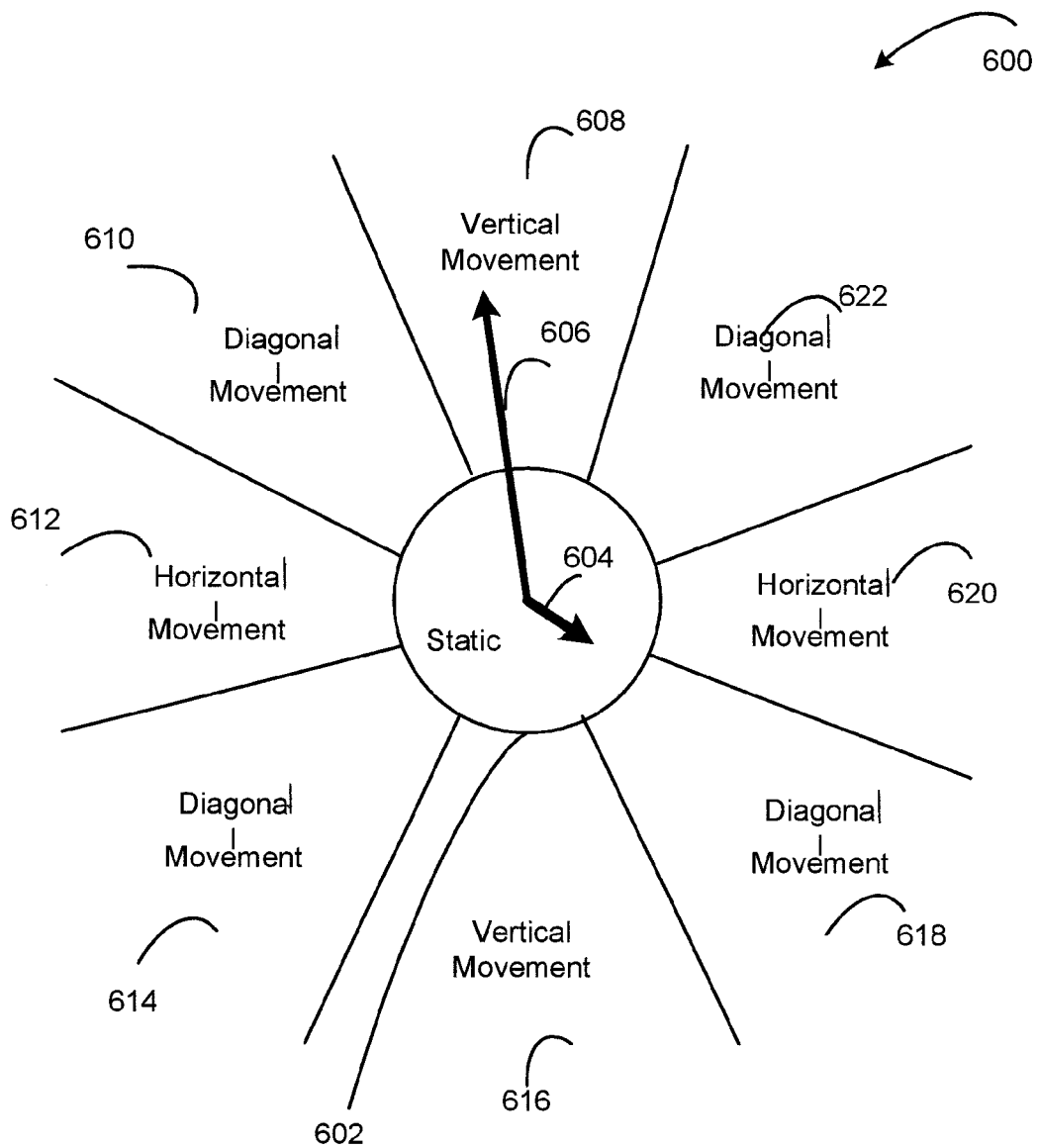
FIG. 6 illustrates the procedure used for determining the global motion characteristic of the scene in the embodiment of the invention.

Generating a pattern matrix is achieved by the pattern matrix generation unit 402. The selection of the pattern matrix is briefly discussed. A scene can be characterized in many different ways. One embodiment of the invention uses the global motion characteristic of a scene to characterize it as static, vertical movement, diagonal movement or horizontal movement. Note that this characterization captures the approximate direction of object movement, with static being a special case that corresponds to little or no movement. Diagram 600 displayed in FIG. 6 is used to explain the procedure used in the determination of the global motion characteristic of a scene. The average motion vector, having an amplitude and a direction, for the scene is computed by adding the motion vectors for the different blocks in the scene and dividing the sum by the number of blocks. The amplitude (or length) of the average motion vector is compared to a given "threshold of no movement" 602 that is set by the user. If the vector amplitude is lower than this threshold value, the scene is classified as static. For example, the average motion vector 604 has an amplitude lower than the threshold of no movement and is determined static. Similarly because the amplitude of the average motion vector 606 is larger than the threshold of no movement, its direction is considered.

The scene characterization space is divided into eight regions in the example of FIG. 6: regions 612 and 620 correspond to horizontal movement, regions 608 and 616 to vertical movement and regions 610, 614, 618, and 622 to diagonal movement. Depending on the region to which the average motion vector belongs, the scene is classified as horizontal movement, vertical movement or diagonal movement (see FIG. 6). In FIG. 6, since the amplitude of the average motion vector 606 is larger than the threshold of no movement, and it lands in a vertical movement region 608 of the diagram, the scene is classified as vertical movement. In one embodiment of the invention a number of pattern matrices that are to be used in the computation of P-SAD are generated and stored in a repository prior to performing motion compensated video coding. Each such pattern matrix corresponds to a particular combination of In_group, no_group and the global motion characteristic of the scene. At run time, the average motion vector for the scene being processed is analyzed, and an appropriate pattern matrix is then retrieved from the repository of pattern matrices (box 508) and used in the computation of P-SAD that is described next.

Figure 7:
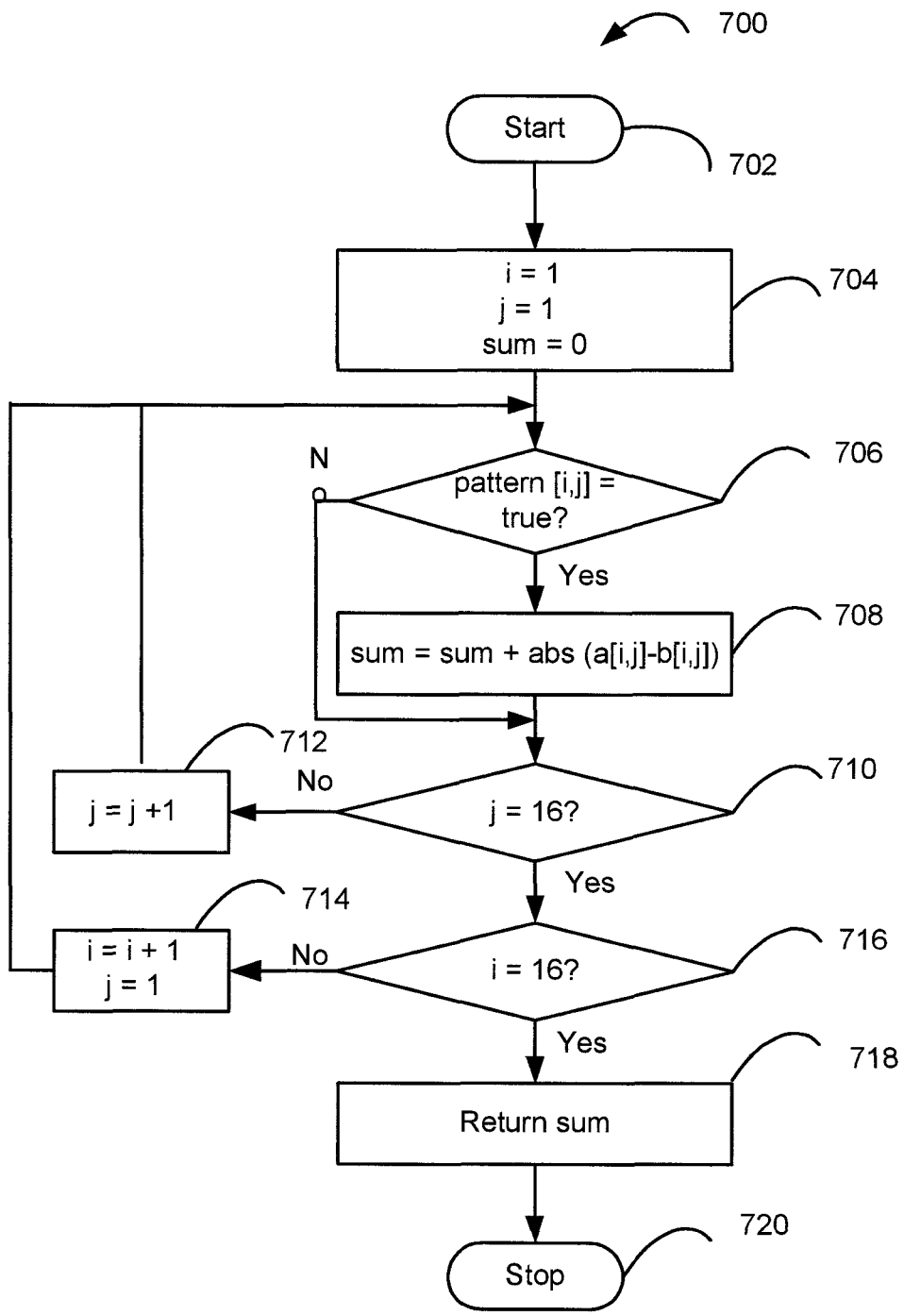
FIG. 7 shows a flowchart illustrating the step "Compute P-SAD" of FIG. 5.

The steps of the method executed in box 510 of FIG. 5 are explained further with the help of flowchart 700 shown in FIG. 7. The explanation is presented in the context of a system that uses image blocks having 16×16 pixels and can be easily extended to images with other blocks sizes. Upon start (box 702), the procedure 700 performs the initialization step (box 704). In this step, the initial values for i and j that store the indices of the current row and column respectively are set to 1 and the variable sum is initialized to 0. After the initialization step, the procedure 700 checks the boolean value stored in cell at the ith row and jth column of the pattern matrix (box 706). If it is "true", the procedure 700 exits "Yes" from box 706 and a[i,j], b[i,j] are used in the computation of the P-SAD as shown in box 708. Otherwise, the procedure 700 exits "No" from box 706 and the a[i,j], b[i,j] values are excluded from the computation of P-SAD. The operation performed in box 708 is thus skipped and the procedure 700 checks whether or not all the columns for the current row are considered (box 710). If not, the procedure 700 exits "No" from box 710, increments the value of j (box 712) to go to the next column and loops back to the entry of box 706. Otherwise, the procedure 700 exits "Yes" from box 710 and checks whether or not all the rows have been covered (box 716). If all rows have been covered, the procedure 700 exits "Yes" from box 716, returns the value in sum (box 718) and exits (box 720). Otherwise, the procedure 700 exits "No" from box 716, increments the value of i and sets the value of j to 1 (box 714) to go to the next row and loops back to the entry of box 706.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect. For example, instead of using the P-SAD function in determination of the metric, an optimized pattern based Mean Squares of Errors (P-MSE) function may be used:

$$P\text{-}MSE = \Sigma_{(i,j \in P)}(a[i,j] - b[i,j])^2$$

As in the case of P-SAD only selected pixels characteristics are used in the computation of the metric. Other functions can also be used in determining the metric, e.g., decibels, as required. Also, instead of the Floor function, a Ceiling function may be used in the determination of no_group (see FIG. 5) when using a slightly higher number of pixels than specified by the pixel budget can be tolerated by the user. In certain embodiments, different units from those shown in FIG. 4(c) may be used in the Improved Metric Determination module 214b for achieving the desired functionality. Moreover, such units may be executed on one computer or distributed over multiple computers.

A computer readable medium, storing instructions thereon for performing the steps of the methods of the embodiments of the invention, comprising a computer memory, DVD, CD-ROM, floppy or the like, is also provided.

Various other modifications may be provided as needed. It is therefore to be understood that within the scope of the given system characteristics, the invention may be practiced otherwise than as specifically described herein.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for determining a metric for use in motion estimation in motion compensated video coding of a scene comprising frames, the method comprising:
   employing at least one Single Instruction Multiple Data (SIMD) processor for determining the metric, comparing a first image block contained in a reference frame and a second image block contained in a current frame, comprising:
      generating a pattern matrix having the same number of rows and columns as the first and second image blocks, said pattern matrix specifying a subset of pixels to be selected in the first and second image blocks; the subset of pixels being divided into a plurality of groups of successive pixels, each group of successive pixels comprising an uninterrupted sequence of two or more pixels in a row, a number of pixels in said each group of successive pixels being selected so that to be operable in a single instruction of the SIMD processor;
      positions of the groups of successive pixels within the first and second image blocks being selected so as to maximize a span of block coverage, wherein:
         vertical distances between any two adjacent groups are substantially equal; and
         horizontal distances between any two adjacent groups are also substantially equal;
      obtaining characteristics of pixels in the subset of pixels for the first and second images blocks; and
      determining the metric based on the obtained characteristics.

2. The method of claim 1, wherein the step of generating further comprises:
   generating a global motion characteristic of the scene indicating a direction of movement of an object in the scene; and
   generating the pattern matrix corresponding to the SIMD processor architecture used for the motion compensated video coding for the global motion characteristic.

3. The method of claim 2, wherein the step of generating the global motion characteristic further comprises:
   determining an average motion vector for the scene, the average motion vector having an amplitude and a direction;
   comparing the amplitude of the average motion vector with a given threshold of no movement, comprising:
      determining the global motion characteristic as static signifying no object movement when the amplitude of the average motion vector is below the threshold; and
   determining the global motion characteristic as one of horizontal movement, vertical movement, or diagonal movement based on the direction of the average motion vector when the amplitude of the average motion vector is equal to or above the threshold.

4. The method of claim 2, wherein the generating the pattern matrix corresponding to the SIMD processor architecture further comprises selecting the pattern matrix from a series of predetermined pattern matrices based on the SIMD processor architecture used for the motion compensated video coding and the global motion characteristic.

5. The method of claim 4, further comprising generating a repository of pattern matrices prior to performing motion compensation, each pattern matrix in the repository corresponding to the SIMD processor architecture used for the motion compensated video coding and the global motion characteristic.

6. The method of claim 5, wherein the generating the repository of pattern matrices further comprises:
   for each pattern matrix in the repository of pattern matrices:
      storing boolean values in cells of the pattern matrix, each cell corresponding to pixels occupying the same position in the first and second image blocks; and storing one of the "true" or "false" boolean values in those cells of the pattern matrix, which correspond to the pixels from the first and second image blocks to be included in a computation of the metric, and storing the other boolean value in those cells of the pattern matrix, which correspond to the pixels in the first and second image blocks to be excluded from the computation of the metric.

7. The method of claim 1, wherein the step of obtaining comprises:
obtaining the characteristic, which is a luminance value;
storing luminance values of pixels in the first image block in cells in a first matrix; and
storing luminance values of pixels in the second image block in cells in a second matrix.

8. The method of claim 7, wherein the processing further comprises:
selecting cells in the first and the second matrices using the pattern matrix; and
applying a Sum of Absolute Differences function on the luminance values stored in the selected cells.

9. The method of claim 7, wherein the processing further comprises:
selecting cells in the first and the second matrices using the pattern matrix; and
applying a Mean Squared Error function on the luminance values stored in the selected cells.

10. A system for determining a metric for use in motion estimation in motion compensated video coding of a scene comprising frames, the system comprising:
a Single Instruction Multiple Data (SIMD) processor;
a memory comprising computer-readable instructions stored thereon for execution by the SIMD processor, forming:
a metric determination unit, determining the metric comparing a first image block contained in a reference frame and a second image block contained in a current frame, comprising:
a pattern matrix generation unit, generating a pattern matrix, having the same number of rows and columns as the first and second image blocks, the pattern matrix specifying a subset of pixels to be selected in the first and second image blocks;
the subset of pixels being divided into a plurality of groups of successive pixels, each group of successive pixels comprising an uninterrupted sequence of two or more pixels in a row, a number of pixels in each group of successive pixels being selected so that to be operable in a single instruction of the SIMD processor;
positions of the groups of successive pixels within the first and second image blocks being selected so as to maximize a span of block coverage, wherein:
vertical distances between any two adjacent groups are substantially equal; and
horizontal distances between any two adjacent groups are also substantially equal;
an image retrieval unit, obtaining characteristics of pixels for the first and second image blocks; and
a metric computation unit, determining the metric based on the obtained characteristics.

11. The system of claim 10, wherein the pattern matrix generation unit further comprises a global motion characteristic determination unit, computing a global motion characteristic of the scene indicating a direction of movement of an object in the scene; and wherein the pattern matrix generation unit is further configured to generate the pattern matrix further based on the global motion characteristic of the scene and the SIMD processor architecture used in the motion compensated video coding.

12. The system of claim 11, wherein the pattern matrix generation unit further comprises:
a pattern matrix repository, storing a series of predetermined pattern matrices, each pattern matrix in the pattern matrix repository corresponding to the SIMD processor architecture used in the motion compensated video coding and the global motion characteristic of the scene; and
a pattern matrix selection unit, selecting the pattern matrix from the pattern matrix repository.

13. The system of claim 10, wherein the characteristic is a luminance value.

14. The system of claim 13, wherein the metric computation unit is configured to apply a Sum of Absolute Differences function on the luminance values of pixels in the subset of pixels.

15. The system of claim 13, wherein the metric computation unit is configured to apply a Mean Squared Error function on the luminance values of pixels in the subset of pixels.

16. A non-transitory computer readable storage medium, having computer readable instructions stored thereon for execution by a Single Instruction Multiple Data (SIMD) processor, causing the processor to perform the steps of the method as described in claim 1.

17. The method of claim 1, wherein the number of pixels in the group of successive pixels to be operable in the single instruction of the SIMD processor is equal to 8.

18. The method of claim 1, further comprising selecting the pattern matrix from a series of predetermined pattern matrices.

19. A system for determining a metric for use in motion estimation in motion compensated video coding of a scene comprising frames, the system comprising:
a Single Instruction Multiple Data (SIMD) processor and a non-transitory computer readable storage medium having computer readable instructions stored thereon for execution by the SIMD processor, causing the SIMD processor to determine the metric comparing a first image block contained in a reference frame and a second image block contained in a current frame, the first and second image blocks having the same number of rows and columns of pixels, comprising:
generating a pattern matrix having the same number of rows and columns as the first and second image blocks, said pattern matrix specifying a subset of pixels to be selected in the first and second image blocks; the subset of pixels being divided into a plurality of groups of successive pixels, each group of successive pixels comprising an uninterrupted sequence of two or more pixels in a row, a number of pixels in each group of successive pixels being selected so that to be operable in a single instruction of the SIMD processor; and positions of the groups of successive pixels within the first and second image blocks being selected so as to maximize a span of block coverage, wherein:
vertical distances between any two adjacent groups are substantially equal; and
horizontal distances between any two adjacent groups are also substantially equal;
obtaining characteristics of pixels in the subset of pixels for the first and second image blocks; and
determining the metric based on the obtained characteristics.

20. The system of claim 19, wherein the computer-readable instructions further cause the SIMD processor to select the pattern matrix from a series of predetermined pattern matrices.

21. The system of claim 20, wherein the computer-readable instructions further cause the SIMD processor to:
generate a global motion characteristic of the scene indicating a direction of movement of an object in the scene; and generate the pattern matrix corresponding to the SIMD processor architecture used for the motion compensated video coding for the global motion characteristic.

22. The system of claim 21, wherein the computer-readable instructions further cause the SIMD processor to:
- determine an average motion vector for the scene, the average motion vector having an amplitude and a direction;
- compare the amplitude of the average motion vector with a given threshold of no movement, comprising:
  - determining the global motion characteristic as static signifying no object movement when the amplitude of the average motion vector is below the threshold; and
  - determining the global motion characteristic as one of horizontal movement, vertical movement, or diagonal movement based on the direction of the average motion vector when the amplitude of the average motion vector is equal to or above the threshold.

23. The system of claim 21, wherein the computer-readable instructions further cause the SIMD processor to select the pattern matrix from the series of predetermined pattern matrices based on the SIMD processor architecture used for the motion compensated video coding and the global motion characteristic.

24. The system of claim 23, wherein the computer-readable instructions further cause the SIMD processor to generate a repository of pattern matrices prior to performing motion compensation, each pattern matrix in the repository corresponding to the SIMD processor architecture used for the motion compensated video coding and the global motion characteristic.

* * * * *